(12) United States Patent
Hand et al.

(10) Patent No.: US 7,783,746 B2
(45) Date of Patent: Aug. 24, 2010

(54) EFFICIENT SYNCHRONIZATION OF ELEMENT MANAGEMENT SYSTEMS TO NETWORK ELEMENT ATTRIBUTES

(75) Inventors: Steven Joseph Hand, San Jose, CA (US); How Tung Lim, San Jose, CA (US); Kasi Pydi Viswanadham, Bangalore (IN); Kiran Dintakurthi, Bangalore (IN)

(73) Assignee: Infinera Corporation, Sunnyvale, CA (US)

( * ) Notice: Subject to any disclaimer, the term of this patent is extended or adjusted under 35 U.S.C. 154(b) by 760 days.

(21) Appl. No.: 11/426,570

(22) Filed: Jun. 26, 2006

(65) Prior Publication Data

US 2007/0150620 A1 Jun. 28, 2007

Related U.S. Application Data

(60) Provisional application No. 60/695,469, filed on Jun. 30, 2005.

(51) Int. Cl.
G06F 15/173 (2006.01)
(52) U.S. Cl. .................................................... 709/224
(58) Field of Classification Search .................. 709/224
See application file for complete search history.

(56) References Cited

U.S. PATENT DOCUMENTS

| | | | | |
|---|---|---|---|---|
| 5,809,094 A * | 9/1998 | Masumoto et al. | .......... | 375/365 |
| 5,956,719 A * | 9/1999 | Kudo et al. | .................. | 707/10 |
| 6,438,563 B1 * | 8/2002 | Kawagoe | ..................... | 707/201 |
| 6,512,824 B1 * | 1/2003 | Hsieh et al. | ................. | 379/230 |
| 6,721,735 B1 * | 4/2004 | Lee | .............................. | 707/5 |
| 7,031,329 B2 * | 4/2006 | Lipsanen | .................... | 370/408 |
| 7,051,097 B1 * | 5/2006 | Pecina | ........................ | 709/224 |
| 7,072,911 B1 * | 7/2006 | Doman et al. | ............... | 707/201 |
| 7,076,736 B2 * | 7/2006 | Hugh | ......................... | 715/743 |
| 7,606,175 B1 * | 10/2009 | Maufer | ....................... | 370/255 |
| 2003/0140132 A1 * | 7/2003 | Champagne et al. | ........ | 709/223 |
| 2004/0044799 A1 * | 3/2004 | Sivaraman et al. | .......... | 709/253 |
| 2004/0128370 A1 * | 7/2004 | Kortright | .................... | 709/221 |
| 2006/0036722 A1 * | 2/2006 | Larkin et al. | ................ | 709/223 |
| 2006/0072626 A1 * | 4/2006 | Hands et al. | ................ | 370/503 |

* cited by examiner

*Primary Examiner*—John Follansbee
*Assistant Examiner*—Imad Hussain
(74) *Attorney, Agent, or Firm*—Christopher Roy Novak; David L. Soltz

(57) ABSTRACT

A system, apparatus and a method are described that synchronizes multiple element management systems with a network element. The synchronization between the management entities within the element is maintained by employing special attributes, such as sentry identification for managed objects and guard attributes for managed object tables. Using these attributes, resynchronization between the management systems is improved by reducing the amount of data retrieved by the systems and reducing the processing load caused by the resynchronization process.

6 Claims, 5 Drawing Sheets

EFFICIENT SYNCHRONIZATION OF ELEMENT MANAGEMENT SYSTEMS TO NETWORK ELEMENT ATTRIBUTES

CROSS REFERENCE TO RELATED PATENT APPLICATIONS

This application claims priority to U.S. Provisional Application Ser. No. 60/695,469, entitled "Efficient Synchronization of Multiple Element Management Systems (EMSs) Independently to a Set of Network Elements (NEs)," filed Jun. 30, 2005, which application is incorporated herein by reference in its entirety.

BACKGROUND

A. Technical Field

The present invention relates generally to the management of networks, and more particularly, to the efficient synchronization of managed network element attributes with element/network management system.

B. Background of the Invention

The importance of optical networking technology in today's society is well understood. Optical networks allow large amounts of information to be transmitted at high data rates across very long distances. The reliance on these networks by individuals and companies requires that the networks operate with minimal failures.

In optical long haul scenarios, multiple channels or wavelengths are typically multiplexed together and inserted into a fiber optic cable that spans a long distance. The optical signal, comprising multiple wavelengths, propagates within the fiber optic cable until its destination is reached. This signal may then be demultiplexed and the individual wavelengths further processed.

Connections within an optical network may be provisioned by switching data at one or more switching nodes. The switching nodes or elements receive data on one port and switch the data to a provisioned output port. Because of this switching capability between ports, these switching nodes may be intermediary devices in a large number of connections that form end-to-end circuits within the network.

In order for these nodes and other network components to operate properly, element/network management systems are installed that monitor and control the network and the connections therein. A fundamental task of the majority of element management systems is to provide complete and accurate information of network element(s) within the network to the user of element management system.

Network elements may need to be restarted during the operation of the network for various reasons. Failures within the network may cause breaks in connections between network elements. These restarts and connection failures may result in a loss of synchronization between the effected network elements and the element/network management system. In particular, certain software objects, states and entities on these network elements may have been added, deleted or modified causing loss of sync with the data store maintained within the element management system or systems.

This synchronization loss between element management data store and software objects on the network elements may potentially lead to loss of accurate visibility of the network to the user of element management system. In such an event, it becomes very important to identify a loss of synchronization of these management objects and entities, and resynchronize them. Traditionally, a complete retrieval technique will be used to synchronize network element data with the element/network management system. This is not an efficient technique because of the bandwidth and time requirements imposed on the network during this process. For example, if one or more element management systems lost connectivity with a network element, then each of these systems must retrieve data from the lost element(s) to re-synchronize itself to these lost element(s). Retrieving and processing this data often incurs load on the network and the network element for extended periods of time.

The re-synchronization between network elements may be accomplished by the element management software systems exhaustively re-synchronizing all of the data relating to each of the software objects and the management systems on the network elements. As mentioned above, this approach is prohibitive in terms of the required bandwidth and processing resources need to accomplish the task and the amount of time consumed to complete the task.

Therefore, there is a need for a system, apparatus and method to provide better and improved scalability and performance of element management resynchronization.

SUMMARY OF THE INVENTION

The present invention provides a system, apparatus and efficient method for re-synchronization of element management system's data store with a network element(s) or node(s) within a transmission network. In one embodiment of the present invention, unique auxiliary attributes are assigned to a group of managed software objects on a node and to each managed object within that group. The unique auxiliary attribute that are assigned to managed objects are called "sentry IDs." The unique auxiliary attributes that are assigned to the group of managed objects are called "guard attributes," which comprise update guards and delete guards.

A list is maintained in element management system that tracks the unique auxiliary attributes on the network elements in order to detect the synchronization status of each managed object within the network elements. Depending on the design of the system, the list may contain information of each managed object at various network elements or a subset thereof. The element management system refers to its own list and compares this subset of information to the list maintained on the network element in order to identify a portion of data that is found to be out of sync due to loss of connectivity with a network element or elements. It can further use the same Sentry Id's and guard attributes to retrieve only that portion of the data found to be out of sync.

In one embodiment of the invention, the plurality of managed objects along with their attributes may be grouped in a managed object table. The managed object table may function as a building block of a typical managed object group, which resides in a network element.

The unique auxiliary attributes are updated depending upon addition, modification or deletion of any managed object. The updating of unique auxiliary attributes may include incrementing the sentry ID each time a managed object is created, deleted or otherwise modified. The update guard is incremented upon any addition or modification of any managed object across an managed object table. The update guard is thereby reflects the maximum value of all sentry IDs for an entire managed object table. The delete guard is incremented when a managed object is deleted from a managed objects table. The element management system also updates its list by adding, modifying or deleting the managed objects according to the updated unique auxiliary attributes.

In one embodiment of the invention, more than one element management system may be allowed to synchronize with a particular network element independent of other management systems that are monitoring the network element. The network element may be required to maintain only a single sentry ID per managed object and a single pair of update/delete guards per managed object table regardless of the number of element management systems simultaneously monitoring the network element.

A system of network elements and one or more element management system having a synchronization technique is provided. Each network element within the network system may comprise a managed object group having plurality of managed object tables. Each managed object table may have one or more managed objects, each having plurality of attributes. Along with these attributes, each managed object table may be assigned a pair of unique auxiliary attributes including an update guard attribute and the delete guard, which may be collectively called guard attributes. Each managed object may also be provided an extra attribute called as sentry ID.

The unique auxiliary attributes or extra attributes may be tracked by the element management system for detecting the synchronization status of each managed object within the network elements. The element management system may maintain a list having information of each managed object. The list may be referenced by the element management system to retrieve the subset of data that is found to be out of sync due to loss of connectivity between network elements. For the case when a delete guard is found to be different between the network element and the element management system's data store, a function is provided by the network element to retrieve the Sentry Id corresponding to each managed object. The element management system will then compare this list against the element management system's data store to identify and remove managed objects that are no longer present on the network element.

Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

A system, apparatus and a method are described that synchronizes multiple element management systems with a network element. The synchronization between the management entities within the element is maintained by employing special attributes, such as sentry identifications for managed objects and guard attributes for managed object tables. Using these attributes, resynchronization between the management systems is improved by reducing the amount of data retrieved by the systems and reducing the processing load caused by the resynchronization process.

The following description is set forth for purpose of explanation in order to provide an understanding of the invention. However, it is apparent that one skilled in the art will recognize that embodiments of the present invention, some of which are described below, may be incorporated into a number of different computing systems and devices. The embodiments of the present invention may be present in hardware, software or firmware. Structures shown below in the diagram are illustrative of exemplary embodiments of the invention and are meant to avoid obscuring the invention. Furthermore, connections between components within the figures are not intended to be limited to direct connections. Rather, data between these components may be modified, re-formatted or otherwise changed by intermediary components.

Reference in the specification to "one embodiment", "in one embodiment" or "an embodiment" etc. means that a particular feature, structure, characteristic, or function described in connection with the embodiment is included in at least one embodiment of the invention. The appearances of the phrase "in one embodiment" in various places in the specification are not necessarily all referring to the same embodiment.

A. Overview

A network element has a data store that controls the element relative to other elements within the network. This data store includes a large database of managed objects that relate to various characteristics and operations of the network element.

Figure 1:
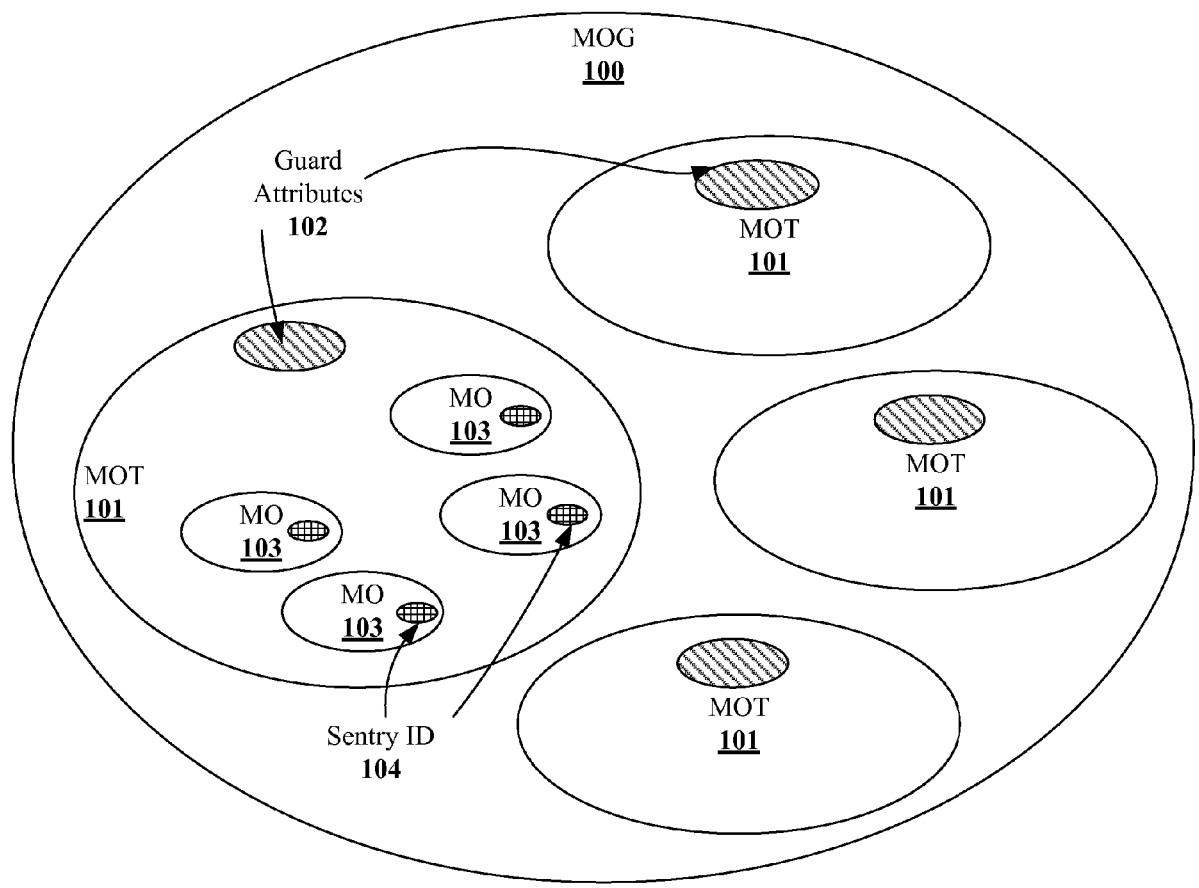
FIG. 1 illustrates structure of a managed object group according to one embodiment of the invention.

FIG. 1 shows a structure of an exemplary managed object group 100 according to one embodiment of the invention. A managed object group 100 may have one or more managed objects tables 101, one such example of an object table is the cross connect table having a number of rows and columns. A row within a managed objects table 101 may correspond to a single managed object 103 and each column may correspond to an attribute of that managed object 103.

SONET Client Connection termination point managed object may have attributes like alarm status, operational state, etc.

It is known in the art that the managed objects should be identified individually. A primary identifier, such as key name or a unique ID, may be provided to a managed object. Along with this unique ID, a managed object 103 may also be provided with an extra or auxiliary attribute called a sentry ID 104. In one embodiment of the invention, each time a managed object 103 is created or modified in any managed object table 101, a network element wide sentry ID counter is incremented and the sentry ID 104 associated with the object 103 is updated based on this network wide sentry ID counter.

The sentry ID 104 values are assigned across a plurality of the managed objects 103 in order to detect differences between the last checkpoint time and the current state of the attributes at a network element. A checkpoint time is the time at which last synchronization happen with the network element and corresponding element management system.

A sentry ID 104 may be used to more efficiently synchronize a network element. In particular, whenever a connectivity loss occurs between the element management system and a network element the connectivity is required to be reestablished, the element management system may ask the network element for its last checkpoint value. Once the checkpoint is identified, the element management system may retrieve only the required data for resynchronization from the network element using the checkpoint value as a reference. Accordingly, the amount of retrieved data is reduced and provides an improved utilization of CPU time within the node and network bandwidth between the network element and the element management system.

Figure 2:
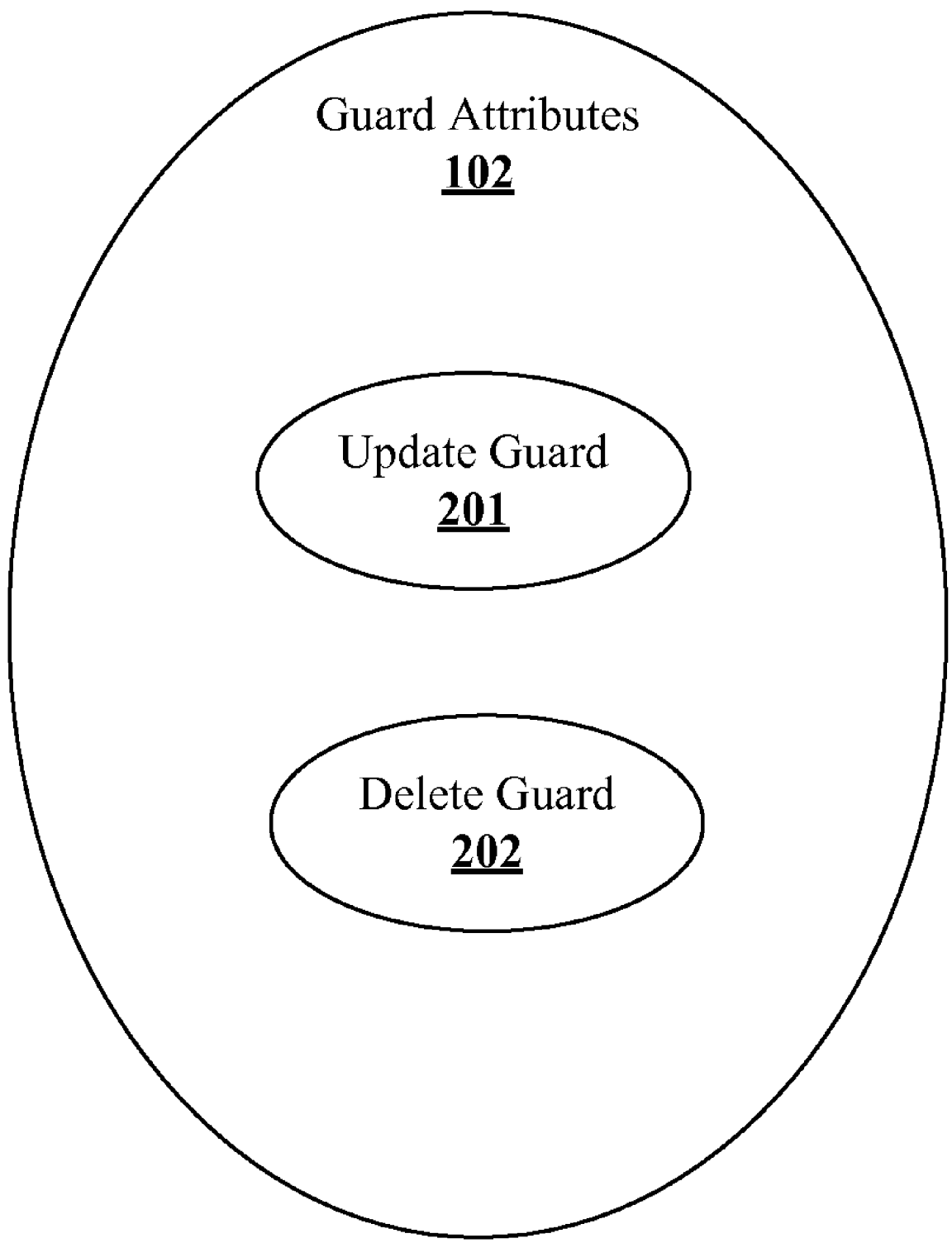
FIG. 2 illustrates types of a guard attribute within a managed object table according to one embodiment of the invention.

Similar to the sentry ID 104, a pair of guard attributes 102 is provided for each managed object table 101 in a managed object group 100. The guard attributes 102 may include an update guard 201 and a delete guard 202 as shown in FIG. 2. An update guard 201 may be updated upon obtaining the maximum value of a sentry ID 104 for an entire managed objects table 101. Comparatively, a delete guard 202 may be updated or incremented when any managed object is deleted from the managed objects table 101. The sentry IDs 104 and guard attributes 102 provide a method for the element management system to detect the addition, modification, and removal of various managed objects present in a managed object group 100 providing an indication of activity on the managed objects 103 within the group 100.

These guard attributes 102 and sentry IDs 104 may be used to synchronize multiple network elements to an element management system or systems. Since the information of any addition, modification, and removal of the managed object in a network is indicated by a corresponding sentry ID 104 and guard attributes 102, the element management system may more efficiently maintain synchronization across a network by tracking the sentry IDs 104 for each managed object, and the update guards 201 and delete guards 202 for each managed object table 101.

The element management system may retrieve the relevant objects from a database or managed object table 101 within the network element and store them in a database or other persistent data storage. The element management system may retrieve the sentry IDs 104 for all managed object tables from its persistent storage as well as the update guard 201 and delete guards 202 for the managed object tables 101 of managed object group 100. Additionally, the element management system may retrieve keys and sentry IDs 104 for a particular managed object table. Furthermore, the element management system may retrieve a specific managed object associated with a particular key.

In one embodiment of the invention, each network element is configured to perform operations that allow each element management system to independently determine the managed object tables and entries therein that are not synchronized. At the time of resynchronization, the element management system may also retrieve portions of data that are out of sync by retrieving all the managed objects for a given managed object table 101, which have a sentry ID 104 larger than a particular value.

This retrieval is made more efficient because the element management system is able to retrieve by using the sentry ID 104 values to as a time parameter in the retrieval of this data. Furthermore, if a table was modified by a deleted managed object 103, then all keys and sentry IDs 104 for the corresponding managed object table 101 may be retrieved to obtain an exhaustive list of the keys and their associated sentry IDs 104 without retrieving the contents of the managed objects. This permits the element management system to identify and remove the entries in the element manager's data store that are no longer present on the network element efficiently.

In one embodiment of the invention, the element management system may determine which managed object tables have been modified or deleted by the retrieval and analysis of the update and delete guards of the managed object tables.

Synchronization is made possible through a combination of information in the element management system and the up-to-date information at the network element relative to guard status. For example, if a modified and updated 'update guard' 201 is different from the element manager's corresponding 'update guard' but the network element's 'delete guard' matches the element manager's paired 'delete guard' 202, then an element management system is able to determine that a managed object table 101 has been modified but no entries have been deleted.

The element management system may check this exhaustive list of guard attributes against its list stored within the database. For each entry on a network element with a new 'update guard' for a managed object table, the element management system may retrieve the corresponding managed object 103 by retrieving all managed objects for a given managed object table 101 having a Sentry ID greater than the 'update guard' for that managed object table on the element management system. For the case when a delete guard is found to be different between the network element and the element management system's data store, a function is provided by the network element to retrieve the Sentry Id corresponding to each managed object. The element management system then compares this list against the element management system's data store to identify and remove managed objects within its data store that are no longer present on the network element.

B. Resynchronization Performance

Figure 3:
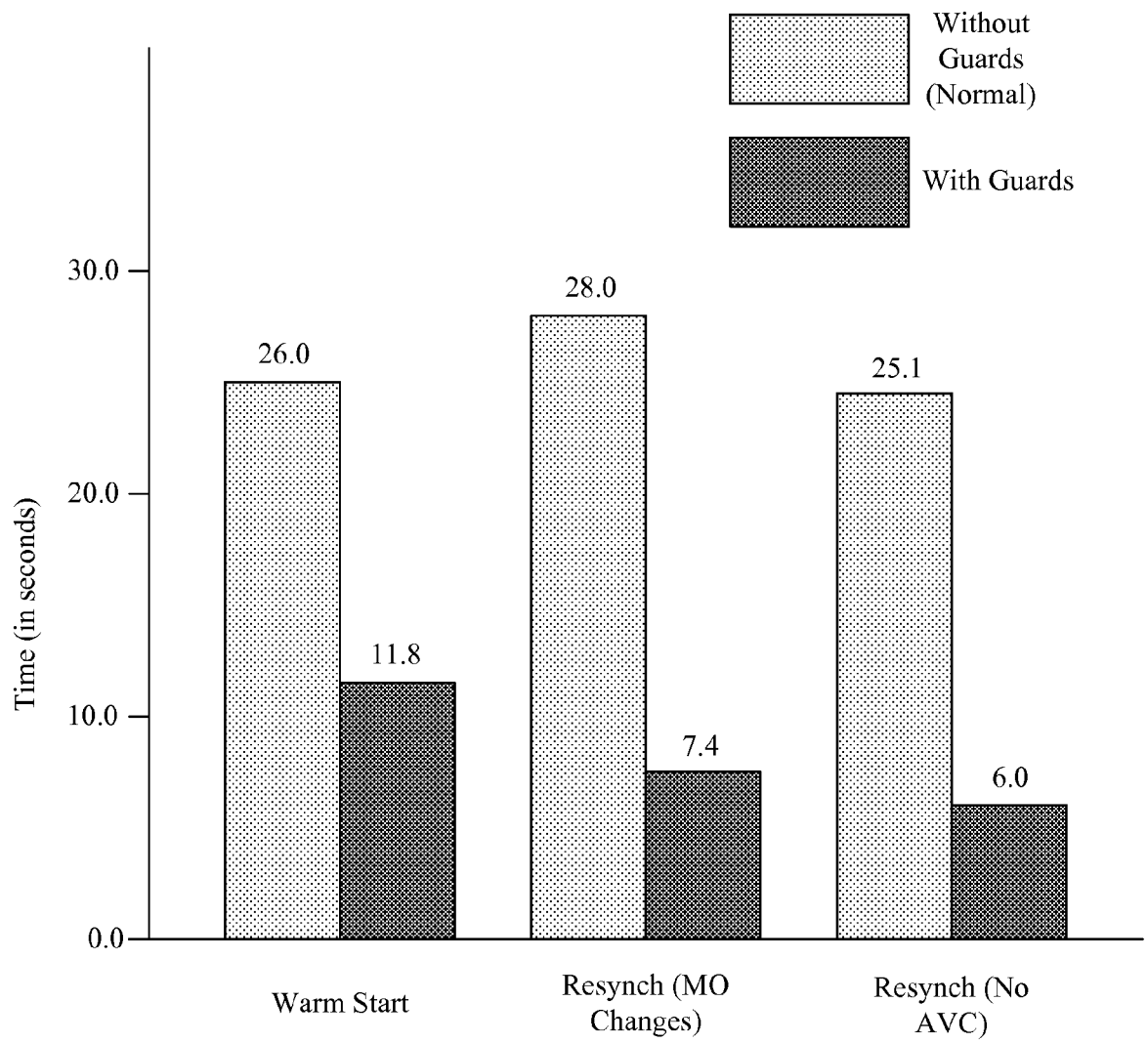
FIG. 3 illustrates the effect of guard attributes on time taken for synchronization in one node according to one embodiment of the invention.
Figure 4:
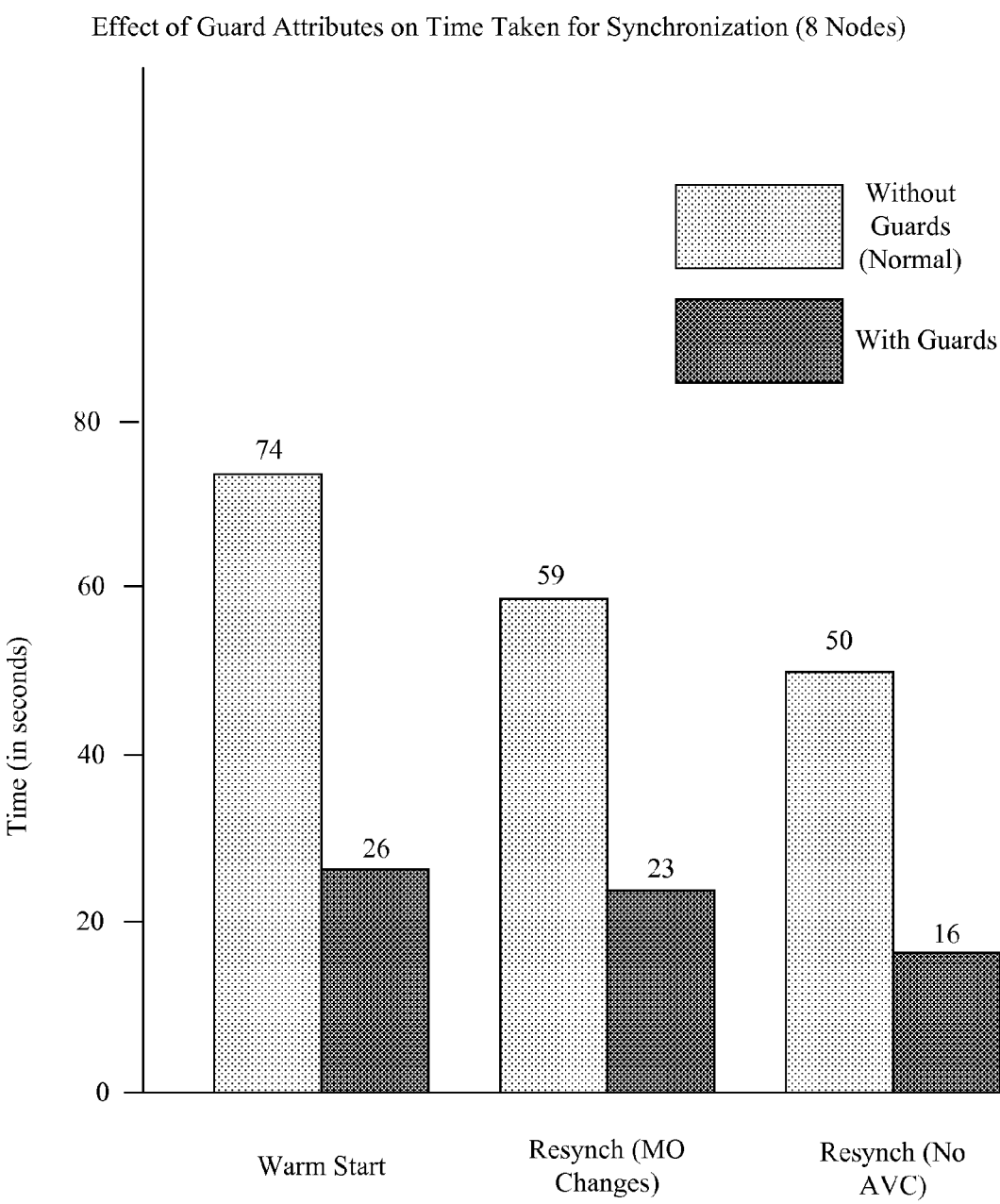
FIG. 4 illustrates the effect of guard attributes on time taken for synchronization in multiple nodes according to another embodiment of the invention.

FIG. 3 and FIG. 4 show exemplary experimental results relating to resynchronization of a network element(s) in order to further explain various embodiments of the present invention. As previously explained, element management systems may synchronize with a network element by maintaining only a single sentry ID for each managed object and a single pair of update/delete guards for each managed objects table.

In one embodiment of the invention, the guard attributes provided from the managed objects table are analyzed by the element management system to identify any changes. If a change in the guard attributes is found, then the element management system retrieves those values from the managed object within the managed objects table. However, the element management system is not required to check each and every managed object for retrieval of this data. Only the modified managed objects present in the database are retrieved because of the availability of the checkpoint value stored within the network element. Accordingly, the element management system need only upload the minimum set of values required to update its information by comparison of its state with those of the network element. This minimum data retrieval significantly reduces the amount of time required for resynchronization at the network element node as illustrated by the experimental results graphically shown in FIG. 3 and FIG. 4.

The results of time taken for synchronization for one node and a plurality of nodes are shown in FIGS. 3 and 4. These results correspond to the cases where no guard attributes are used (i.e. normal), as well as cases where guard attributes are provided. After comparison, it can readily be seen that the managed objects tables with guard attributes provide for relatively faster synchronization.

As an alternative, at the expense of extra storage required at the network element, deleting a managed object by marking an entry deleted instead of removing the object would permit the removal of the delete guard, which would allow deletions to be synchronized. Once the synchronization between the two systems have been done, the management system can present the data in the correct fashion as exactly what it is there on an independent device.

C. Method for Synchronization of Managed Objects

Figure 5:
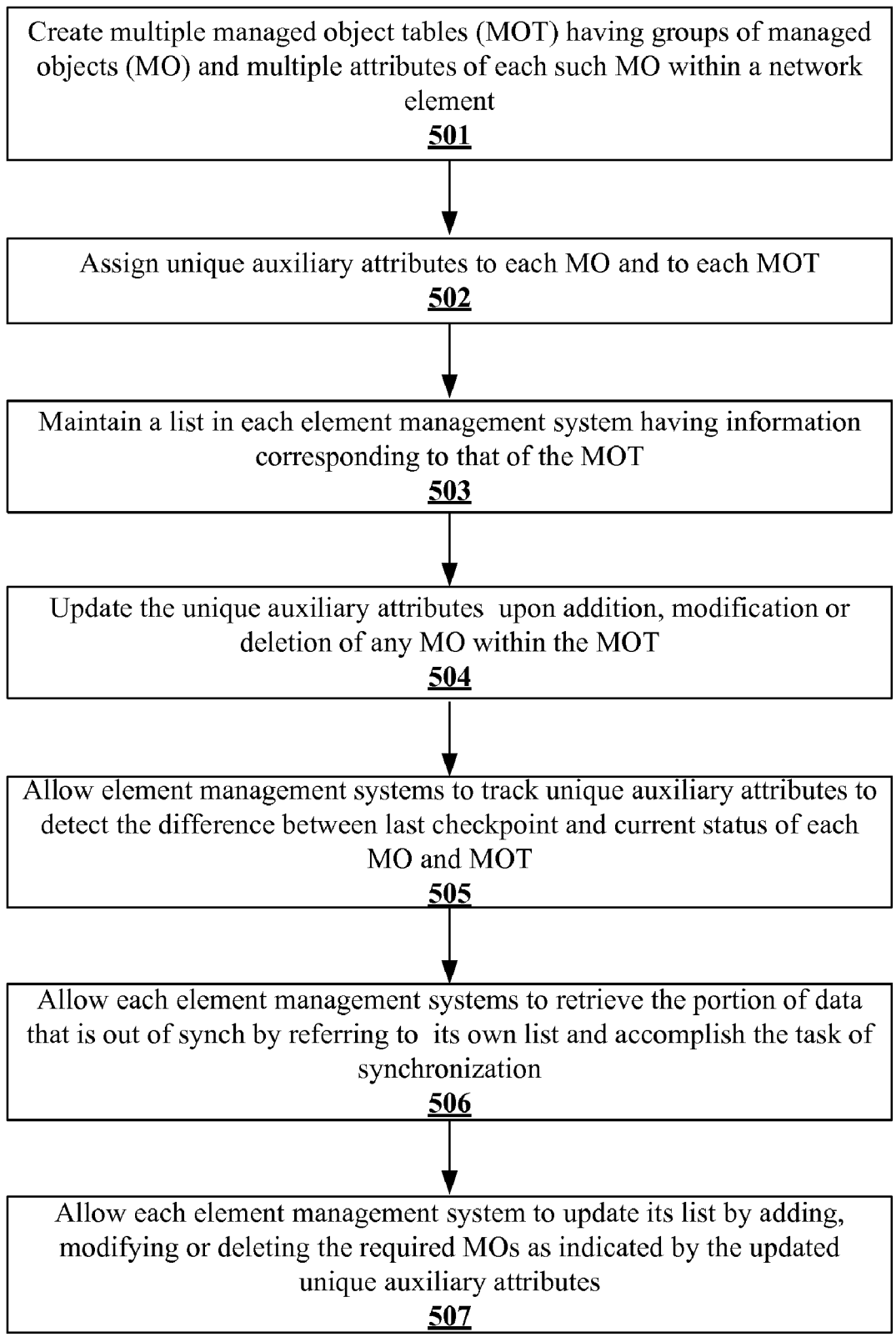
FIG. 5 is a flowchart illustrating the general method for efficiently synchronizing plurality of management software entities with a set of attributes at remote network elements according to one embodiment of the invention.

FIG. 5 illustrates a general method for synchronizing a plurality of managed objects in a transmission network. The method may be initiated by creating multiple managed object tables having groups of managed objects and multiple attributes of each such managed object within a network element 501. Unique auxiliary attributes are assigned to each managed object and to each managed objects table 502. A list may be maintained in each element management system having information corresponding to that of the management objects tables 503. The unique auxiliary attributes are updated depending upon addition, modification or deletion of any managed object within the managed objects table 504.

The element management system tracks the unique attributes to detect the synchronization status of each managed object and managed objects table 505. Thereafter, each element management system may identify and retrieve a specific portion of data that is out of sync by referring to its own list in order to synchronize the data 506. Each element management system updates its list by adding, modifying or deleting the required managed objects as indicated by the updated auxiliary attributes 507.

The foregoing description of the invention has been described for purposes of clarity and understanding. It is not intended to limit the invention to the precise form disclosed. Various modifications may be possible within the scope and equivalence of the appended claims.

We claim:

1. A method, comprising:
   providing a table in a network element that includes a first plurality of software objects, the network element being provided in an optical network, the optical network including an element management system and a connection including a fiber optic cable;
   providing a list in the element management system, the list including a second plurality of software objects, each of the second plurality of software objects corresponding to a respective one of the first plurality of software objects;
   providing a first plurality of attributes, each of which being associated with a corresponding one of the first plurality of software objects, the first plurality of attributes being provided in the network element;
   providing a second plurality of attributes associated with the table, the second plurality of attributes being provided in the network element;
   modifying one of the first plurality of software objects in response to a fault in the connection;
   modifying the first and second pluralities of attributes after said one of the first plurality of software objects has been modified, the modified first and second pluralities of attributes being indicative of the modified one of the first plurality of software objects;
   determining, with the element management system, that the first and second pluralities of attributes have been modified;
   identifying, based on the modified first and second pluralities of attributes, data in the table corresponding to the modified one of the plurality of software objects;
   supplying the data from the table to the element management system; and
   modifying one of the second plurality of software objects based on the data, the modified one of the second plurality of software objects corresponding to the modified one of the first plurality of software objects, such that the modified one of the first plurality of software objects and the modified one of the second plurality of software objects are synchronized with one another.

2. A method in accordance with claim 1, wherein the network element includes a CPU.

3. An optical network, comprising:
   a network element having a table and a first plurality of software objects;
   a connection including a fiber optic cable;
   an element management system including a list, the list including a second plurality of software objects, each of the second plurality of software objects corresponding to a respective one of the first plurality of software objects,
   wherein the network element is configured to: provide within the network element a first plurality of attributes, each of which being associated with a corresponding one of the first plurality of software objects; provide within the network element a second plurality of attributes associated with the table; modify one of the first plurality of software objects in response to a fault in the connection; modify the first and second pluralities of attributes after said one of the first plurality of software objects has been modified, the modified first and second pluralities of attributes being indicative of the modified one of the first plurality of software objects; and
   the element management system is configured to determine that the first and second pluralities of attributes have been modified; identify, based on the modified first and second pluralities of attributes, data in the table corresponding to the modified one of the plurality of software objects, obtain the data from the table, and modify one of the second plurality of software objects based on the data, the modified one of the second plurality of software objects corresponding to the modified one of the first plurality of software objects, such that the modified one of the first plurality of software objects and the modified one of the second plurality of software objects are synchronized with one another.

4. An optical network in accordance with claim 3, wherein the network element includes a CPU.

5. A method, comprising:
   providing a table in a network element that includes a first plurality of software objects, the network element being provided in an optical network, the optical network including an element management system and a connection that includes a fiber optic cable;
   providing a list in the element management system, the list including a second plurality of software objects, each of the second plurality of software objects corresponding to a respective one of the first plurality of software objects;
   providing a first plurality of attributes, each of which being associated with a corresponding one of the first plurality of software objects, the first plurality of attributes being provided in the network element;

providing a second plurality of attributes associated with the table, the second plurality of attributes being provided in the network element;

adding a third software object to the first plurality of software objects;

modifying the first and second pluralities of attributes after the third software object has been added to the first plurality of software objects, in response to a fault in the connection;

determining, with the element management system, that the first and second pluralities of attributes have been modified;

identifying, based on the modified first and second pluralities of attributes, data in the table corresponding to the third software object;

supplying the data from the table to the element management system; and adding a fourth software object to the second plurality of software objects based on the data, the fourth software object corresponding to the third software object, such that the third and fourth software are synchronized with one another.

6. A method in accordance with claim 5, wherein the network element includes a CPU.

* * * * *